Figure 1:
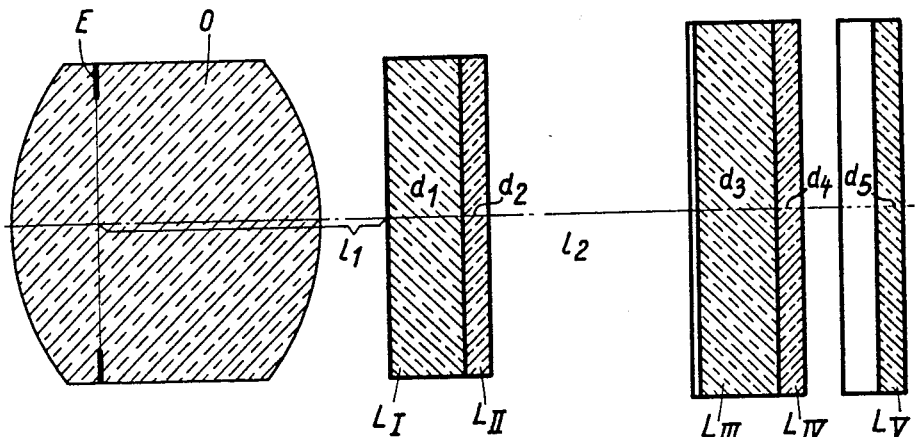

Oct. 25, 1955  H. KÖHLER ET AL  2,721,500
ANAMORPHOTIC ANCILLARY LENS SYSTEM
Filed Sept. 8, 1953

United States Patent Office 2,721,500  
Patented Oct. 25, 1955

2,721,500

ANAMORPHOTIC ANCILLARY LENS SYSTEM

Horst Köhler, Heidenheim (Brenz), and Helmut Knutti, Oberkochen, Germany, assignors to Carl Zeiss, Heidenheim (Brenz), Wurttemberg, Germany Application September 8, 1953, Serial No. 378,790

Claims priority, application Germany August 24, 1953

10 Claims. (Cl. 88—57)

The present invention is relative to an afocal ancillary lens system which is set up in the projection path of rays of a photographic objective on the side of the longer distance between back lens and image and serves for obtaining an image sharp in all image points of an object in the image plane of the so completed system in such a way that the linear magnification is different in two diameters of the image plane which are vertical to each other. Thus, the ancillary system is to effect an anamorphotic image.

The invention is especially related to such systems which consist of a member positioned in front of the objective having positive cylindrical power and another member separated from the first of air and having a negative cylindrical power, the cylinder axes of these members being parallel to each other. The cylinder axes of the two members of the ancillary lens system lie in vertical planes so that the system in the horizontal plane decreases the focal length of the photographic projection objective while in the vertical plane the focal length remains unchanged, i. e. in the horizontal plane a change of the image scale is effected while in the vertical plane the image scale remains unchanged. With systems of this type it is also possible in the known manner to bring about a projection in finite distance whereat the system is given a finite focal length by displacing the members so that the effect of the system can be called almost afocal. For the solution of this task a system has already been proposed which consists of two members of which each is composed of a converging cylindrical lens and a diverging cylindrical lens which is cemented together with the former. Thus, this system consists of four lenses. Such a system finds preferential use for anamorphotic stresses by about factor 1.5; basically, this is true also for higher anamorphotic stresses with a factor up to about 2.5 where, however, the elimination of distortion and coma is comparatively difficult. For this reason it is necessary for these larger anamorphotic stresses to use systems with at least five lenses. In themselves, such systems are known. Beside one member of converging cylindrical power of refraction they contain one member of diverging cylindrical power of refraction which consists of three cylinder lenses which are cemented together. With these known systems no sufficient correction of distortion and coma can be obtained as has been proven by trigonometric computation.

The subject of the invention is an ancillary lens system which contains one member of converging cylindrical power of refraction and two partial members of which one consists of two lenses cemented together and the other is an individual lens of diverging power of refraction separated by air from this cemented partial member.

According to the invention the cemented partial member as well as the independent diverging individual lens are to have the form of plane concave lenses. This is of considerable advantage for the production of such lenses. This design of the lenses with plane surfaces is obtained in the construction forms of the invention by guaranteeing at the same time a sufficient correction by the fact that the cemented partial member is arranged between the member of converging power of refraction and the independent diverging individual lens.

Another favoured form of construction of the system according to the invention is further obtained by the fact that the cementing surface of the cemented partial member is of converging effect and turns its concave side toward the member of converging power of refraction.

In keeping with an advantageous form of construction according to the invention it is practical to have the air distance between the independent diverging individual lens and the cemented partial member greater than 14% and smaller that 27% of the absolute value of the total focal length of the two partial members. The lower limit of this distance is subject to consideration of the height of camber of the concave radius of the independent individual lens. The upper limit results from the demand of a small high of the passing rays in order that the individual lens does not have to be made unnecessarily large.

Preferred forms of construction of a system according to the invention are that the member of converging power of refraction is composed of a converging lens and a diverging lens cemented together with the former in such a way that these two lenses together form a diverging cementing surface which turns its convex side toward the cemented partial member.

According to the invention the error correction can best be obtained in that the outer radii of the member of converging power of refraction have opposite signs and are in a relation whose absolute value is within the limits of 1:1 and 1:∞ whereby the longer radius is on the side toward the cemented partial member.

Furthermore, it is of advantage for the correction to keep the absolute values of the radii of the cementing surface in the two cemented members and of the radius of the independent diverging individual lens on the side of the cemented partial member each within the limits of 30 and 60% of the individual focal lengths ($f_1$, $f_2$) of the respective members.

In order to keep the zonal errors and Gauss errors as small as possible it is further advantageous according to the invention to choose the difference of the refractive indices of each of the two cementing surfaces larger than 0.1.

The following illustrations show an example of the ancillary lens system of the invention with the lenses $L_I$, $L_{II}$, $L_{III}$, $L_{IV}$, $L_V$ and in the inclosed table the numerical values for this example are given.

Figure 2:
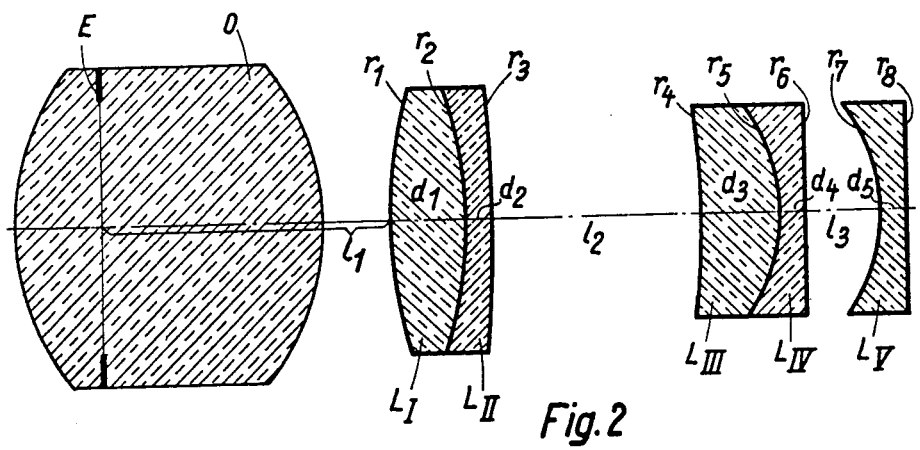

Fig. 1 shows a vertical cross-section and Fig. 2 a horizontal cross-section through the entire system consisting of a photographic objective of any form of construction and the ancillary lens system which corresponds with the numerical value of the table.

The designations therein are as follows:

L the individual lenses,  
r the radii  
d the thicknesses  
l the air distances  
E the plane of the crossing of the main rays which in case of application of the entire system as a photographic objective is at the same time exit pupil of the ancillary lens system and entrance pupil of the objective while in the case of use as a projection objective the roles of entrance and exit pupil are interchanged.

Further designations are:

$n_d$ for the refractive indices  
$V_d$ the Abbe numbers of the glasses, and  
$\Delta n/r$ the refractive powers of the individual lens surfaces.

Example $f_1$ = individual focal length of the converging member $(L_I, L_{II})$ = +150.3
$f_2$ = individual focal length of the diverging member $(L_{III}, L_{IV}, L_V)$ = −75.0
Anamorphotic stress in the horizontal section 2.0×

| Radii | Thicknesses and Distances | $n_d$ | $V_d$ | $\Delta n/r$ |
|---|---|---|---|---|
| $r_1 = +89.125$ | $l_1 = 54.0$ | | | +0.00632819 |
| | $d_1 = 14.0$ | 1.5640 | 58.1 | −0.00209839 |
| $r_2 = -78.298$ | $d_2 = 5.0$ | 1.7283 | 28.3 | +0.00247494 |
| $r_3 = -294.27$ | $l_2 = 39.5$ | | | |
| $r_4 = -170.31$ | $d_3 = 15.0$ | 1.7234 | 38.0 | −0.00424755 |
| $r_5 = -33.497$ | | | | +0.00628713 |
| $r_6 = \infty$ | $d_4 = 5.0$ | 1.5128 | 57.2 | 0.0 |
| $r_7 = -33.982$ | $l_3 = 14.0$ | | | −0.01562886 |
| $r_8 = \infty$ | $d_5 = 5.0$ | 1.5311 | 62.1 | 0.0 |

We claim:

1. Afocal ancillary lens system arranged in the imaging path of rays of a photographic objective on the side of the longer instance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other, said member of negative cylindrical power containing two partial members of which one consists of two lenses of opposite refractive power cemented together and the other is an individual lens of diverging power of refraction separated by air from this cemented partial member, said cemented partial member being located between said member of positive power of refraction and said individual lens, and said lens of negative refractive power of said cemented partial member being adjacent to said diverging individual lens.

2. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the cemented partial member as well as the independent diverging individual lens have the form of plane concave lenses.

3. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the cemented partial member is arranged between the member of converging power of refraction and the independent diverging individual lens.

4. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the cementing surface of the cemented partial member is of converging effect and turns its concave side toward the member with converging power of refraction.

5. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the air distance between the independent diverging individual lens and the cemented partial member is larger than 14% and smaller 27% of the absolute value of the entire focal length of the two partial members.

6. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the member of converging power of refraction is composed of a converging lens and a diverging lens cemented together with the former in such a way that these two lenses together form a diverging cementing surface which turns its convex side toward the cemented partial member.

7. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the outer radii of the member of converging refractive power have opposite signs and are in a relation to each other whose absolute value is within the limits of 1:1 and 1:∞ whereby the longer radius is turned toward the cemented partial member.

8. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the absolute values of the radii of the cementing surfaces in the two cemented members and the radius of the independent diverging individual lens turned toward the cemented partial member each are within the limits of 30 and 60% of the individual focal length ($f_1$, $f_2$) of the respective members.

9. Afocal ancillary lens system arranged in the imaging path of rays of a photographic objective on the side of the longer distance between back lens and image and serves for obtaining an image sharp in all image points of an object in the image plane of the entire system in such a way that the linear magnification is different in two diameters of the image plane which are vertical to each other, and which consists of a member, adjacent to the objective, of positive cylindrical power of refraction and of another member, separated from the former by air, with negative cylindrical power of refraction whereby the cylinder axes of the two members are parallel to each other and which contains two partial members of which one consists of two lenses cemented together and the other is an individual lens of diverging power of refraction separated by air from this cemented partial member, whereby the difference between the refractive indices of each of the two cementing surfaces is larger than 0.1.

10. Ancillary lens system according to claim 1, characterized in that the powers of refraction ($\Delta n/r$) of the refracting surfaces ($r_1 \ldots r_8$) each deviate by a maximum of $\pm 0.2$ f (f is in each case related to the individual focal lengths of the members containing the respective surfaces) from the values taken from the following numerical example:

$f_1$ = individual focal length of the converging member ($L_I$, $L_{II}$) = +150.3
$f_2$ = individual focal length of the diverging member ($L_{III}$, $L_{IV}$, $L_V$) = −75.0
Anamorphotic stress in the horizontal section 2.0×

| Radii | Thicknesses and Distances | $n_d$ | $V_d$ | $\Delta n/r$ |
|---|---|---|---|---|
| $r_1 = +\ 89.125$ | $l_1 = 54.0$ | | | +0.00632819 |
| $r_2 = -\ 78.298$ | $d_1 = 14.0$ | 1.5640 | 58.1 | −0.00209839 |
| $r_3 = -294.27$ | $d_2 = 5.0$ | 1.7283 | 28.3 | +0.00247494 |
| $r_4 = -170.31$ | $l_2 = 39.5$ | | | −0.00424755 |
| $r_5 = -\ 33.497$ | $d_3 = 15.0$ | 1.7234 | 38.0 | +0.00628713 |
| $r_6 = \infty$ | $d_4 = 5.0$ | 1.5128 | 57.2 | 0.0 |
| $r_7 = -\ 33.982$ | $l_3 = 14.0$ | | | −0.01562886 |
| $r_8 = \infty$ | $d_5 = 1.0$ | 1.5311 | 62.1 | 0.0 |

References Cited in the file of this patent

UNITED STATES PATENTS

| | | |
|---|---|---|
| 988,720 | Kohler | Apr. 4, 1911 |
| 1,829,633 | Chretien | Oct. 27, 1931 |
| 1,938,808 | Ceccarini | Dec. 12, 1933 |
| 1,945,951 | Newcomer | Feb. 6, 1934 |
| 1,962,892 | Chretien | June 12, 1934 |
| 2,006,233 | Chretien | June 25, 1935 |
| 2,121,567 | Newcomer | June 21, 1938 |

FOREIGN PATENTS

| | | |
|---|---|---|
| 8,512 | Great Britain | of 1898 |